US010380929B2

(12) United States Patent
Ma

(10) Patent No.: US 10,380,929 B2
(45) Date of Patent: Aug. 13, 2019

(54) GOA DRIVE UNIT AND GOA DRIVE CIRCUIT

(71) Applicant: WUHAN CHINA STAR OPTOELECTRONICS TECHNOLOGY CO., LTD., Wuhan, Hubei (CN)

(72) Inventor: Weixin Ma, Hubei (CN)

(73) Assignee: WUHAN CHINA STAR OPTOELECTRONICS TECHNOLOGY CO., LTD, Wuhan (CN)

( * ) Notice: Subject to any disclaimer, the term of this patent is extended or adjusted under 35 U.S.C. 154(b) by 226 days.

(21) Appl. No.: 15/533,836

(22) PCT Filed: May 2, 2017

(86) PCT No.: PCT/CN2017/082712
§ 371 (c)(1),
(2) Date: Jun. 7, 2017

(87) PCT Pub. No.: WO2018/188133
PCT Pub. Date: Oct. 18, 2018

(65) Prior Publication Data

US 2019/0088181 A1 Mar. 21, 2019

(30) Foreign Application Priority Data

Apr. 11, 2017 (CN) .......................... 2017 1 0227247

(51) Int. Cl.
*G06F 3/038* (2013.01)
*G09G 5/00* (2006.01)
(Continued)

(52) U.S. Cl.
CPC ....... *G09G 3/20* (2013.01); *G09G 2300/0408* (2013.01); *G09G 2300/0426* (2013.01);
(Continued)

(58) Field of Classification Search
CPC . G06F 13/4282; G06F 13/4291; G06F 13/364
See application file for complete search history.

(56) References Cited

U.S. PATENT DOCUMENTS

2006/0170643 A1 * 8/2006 Katayama ............ G09G 3/3677
345/100
2009/0129535 A1 5/2009 Chen
(Continued)

FOREIGN PATENT DOCUMENTS

CN 103795396 A 5/2014
CN 105047174 A 11/2015
CN 106486989 A 3/2017

OTHER PUBLICATIONS

International Search Report for International Application No. PCT/CN2017/082712, dated Jan. 17, 2018.
(Continued)

*Primary Examiner* — Nan-Ying Yang

(57) ABSTRACT

Disclosed are a GOA drive unit and a GOA drive circuit. The GOA drive unit includes a bidirectional selection unit. The bidirectional selection unit is activated under an action of a first control signal and a second control signal which are complementary to each other in timing sequence, and outputs a first selection signal. The bidirectional selection unit is activated under an action of a third control signal and a fourth control signal which are complementary to each other in timing sequence, and outputs a second selection signal. The GOA drive unit can reduce the influence of stress and improve the reliability of the GOA drive circuit.

12 Claims, 2 Drawing Sheets

(51) Int. Cl.
*G09G 3/36* (2006.01)
*G09G 3/20* (2006.01)

(52) U.S. Cl.
CPC ............... *G09G 2300/0809* (2013.01); *G09G 2310/0213* (2013.01); *G09G 2310/0243* (2013.01); *G09G 2310/08* (2013.01)

(56) References Cited

U.S. PATENT DOCUMENTS

| | | | | |
|---|---|---|---|---|
| 2010/0182306 | A1 | 7/2010 | Kimura et al. | |
| 2017/0039973 | A1* | 2/2017 | Huang ..................... | G09G 3/36 |

OTHER PUBLICATIONS

Office Action and Search Report for Chinese Patent Application No. 201710227247.0, dated Feb. 14, 2018.

* cited by examiner

GOA DRIVE UNIT AND GOA DRIVE CIRCUIT

CROSS-REFERENCE TO RELATED APPLICATIONS

This application claims the priority of Chinese patent application CN 201710227247.0, entitled "GOA drive unit and GOA drive circuit" and filed on Apr. 11, 2017, the entirety of which is incorporated herein by reference.

FIELD OF THE INVENTION

The present disclosure relates to the field of display panel drive technologies, and in particular, to a GOA drive unit and a GOA drive circuit.

BACKGROUND OF THE INVENTION

Currently, GOA (Gate on array) drive technology has been widely applied in the drive of a display panel. A GOA drive circuit is used for successively outputting line scanning signals to respective pixel unit lines. When the display panel is driven, a forward scanning approach, which is from a first line of pixel units to a last line of pixel units, can be adopted, or a backward scanning approach, which is from the last line of pixel units to the first line of pixel units, can be adopted. Generally, in the GOA drive circuit, a bidirectional selection unit is arranged to transmit a selection signal for controlling a scanning direction.

Usually, the GOA drive circuit is constituted by TFT devices. In a working procedure of the GOA drive circuit, a part of the TFT devices are always in an active state. That is to say, as for a P-type TFT, a low level signal is applied to its gate constantly; while as for an N-type TFT, a high level signal is applied to its gate constantly. When the TFT devices are in the active state for a long duration, they will be affected by a stress constantly. Under the influence of such stress, the electronic mobility of the TFT devices will change, so as to deviate a threshold voltage of the TFT devices, leading to the efficacy loss of the TFT devices. For example, with respect to the bidirectional selection unit in the GOA drive circuit, the TFT devices, which constitute the bidirectional selection unit, are always required to keep in the active state in the line scanning procedure, and thus in a high risk of efficacy loss. This will severely influence the reliability of the GOA drive circuit.

SUMMARY OF THE INVENTION

One of the technical problems to be solved by the present disclosure is to reduce the efficacy loss risk of TFT devices in a GOA drive circuit, so as to improve the reliability of the GOA drive circuit.

In order to solve the above technical problem, a GOA drive unit is provided in an embodiment of the present disclosure. The GOA drive unit comprises a bidirectional selection unit which is used to transmit a selection signal for controlling a scanning direction of the GOA drive unit and is configured to:

receive a first control signal and a second control signal, which enable the bidirectional selection unit to be in an active state in a first timing sequence and a second timing sequence, respectively, and to output a first selection signal for controlling forward scanning of the GOA drive unit, wherein the first timing sequence and the second timing sequence are complementary to each other; and receive a third control signal and a fourth control signal, which enable the bidirectional selection unit to be in an active state in a third timing sequence and a fourth timing sequence, respectively, and to output a second selection signal for controlling backward scanning of the GOA drive unit, wherein the third timing sequence and the fourth timing sequence are complementary to each other.

Preferably, the bidirectional selection unit comprises a first switching element, wherein in the forward scanning, as for the first switching element, its signal input end receives the first selection signal; its first control end receives the first control signal; its second control end receives the second control signal; and its signal output end outputs the first selection signal under an action of the first control signal and the second control signal; and wherein in the backward scanning, as for the first switching element, its signal input end receives the second selection signal; its first control end receives the third control signal; its second control end receives the fourth control signal; and its signal output end outputs the second selection signal under an action of the third control signal and the fourth control signal.

Preferably, the first switching element comprises a first thin film transistor and a second thin film transistor, a source and a drain of the first thin film transistor being correspondingly connected to a source and a drain of the second thin film transistor, respectively;

a gate of the first thin film transistor receives the first control signal or the third control signal, and a gate of the second thin film transistor receives the second control signal or the fourth control signal; and the sources of the first thin film transistor and the second thin film transistor serve as the signal input end of the first switching element, and the drains of the first thin film transistor and the second thin film transistor serve as the signal output end of the first switching element.

Preferably, the bidirectional selection unit comprises a second switching element and a third switching element, wherein as for the second switching element, its signal input end receives the first selection signal; its first control end receives the first control signal; and its second control end receives the second control signal; and wherein as for the third switching element, its signal input end receives the second selection signal; its first control end receives the third control signal; and its second control end receives the fourth control signal, wherein in the forward scanning, a signal output end of the second switching element outputs the first selection signal under an action of the first control signal and the second control signal, and the third switching element is in a closed state under an action of the third control signal and the fourth control signal; and wherein in the backward scanning, a signal output end of the third switching element outputs the second selection signal under a function of the third control signal and the fourth control signal, and the second switching element is in a closed state under a function of the first control signal and the second control signal.

Preferably, the second switching element comprises a first thin film transistor and a second thin film transistor, a source of the first thin film transistor being correspondingly connected to a source of the second thin film transistor; the third switching element comprises a third thin film transistor and a fourth thin film transistor, a source of the third thin film transistor being correspondingly connected to a source of the fourth thin film transistor; and drains of respective thin film transistors are connected;

a gate of the first thin film transistor receives the first control signal; a gate of the second thin film transistor receives the second control signal; a gate of the third thin film transistor receives the third control signal; and a gate of the fourth thin film transistor receives the fourth control signal; and the sources of the first thin film transistor and the second thin film transistor serve as the signal input end of the second switching element; the sources of the third thin film transistor and the fourth thin film transistor serve as the signal input end of the third switching element; and the drains, which are connected together, of the respective thin film transistors serve as a common signal output end of the second switching element and the third switching element.

Preferably, the first control signal, the second control signal, the third control signal, and the fourth control signal are all square signals.

Preferably, a frequency of the square signals is in a range from 0.0005 Hz to 30 Hz.

Preferably, an amplitude of the square signals has a high voltage of +9 V and a low voltage of −7 V.

Preferably, each of the thin film transistors is an N-type thin film transistor or a P-type thin film transistor.

A GOA drive circuit is also provided in an embodiment of the present disclosure. The GOA drive circuit comprises cascaded GOA drive units as described above.

The control signals, whose working timing sequences are complementary to each other, control the opening and closing of the TFT devices in the GOA drive circuit, so that in a line scanning drive procedure, the respective TFT devices can be turned on alternately. This shortens a constant active duration of the TFT devices and mitigates the influence of the stress on the TFT devices effectively. Hence, the risk of the efficacy loss of the TFT devices is reduced and the reliability of the GOA drive circuit is improved.

Other advantages, objectives, and features of the present disclosure will be illustrated to a certain extent in the following description, and to some degree, become self-evident therefrom, or be understood by those skilled in the art through implementation of the present disclosure. The objectives and other advantages of the present disclosure can be achieved and obtained through the structures specifically indicated in the following description, claims, and the accompanying drawings.

BRIEF DESCRIPTION OF THE DRAWINGS

The drawings are used to provide further understanding of the technical solution of the present disclosure or the prior art, and constitute one part of the description. The drawings expressing the embodiments of the present disclosure, together with the embodiments of the present disclosure, are used to illustrate the technical solution of the present disclosure but do not constitute limitations to the technical solution of the present disclosure.

DETAILED DESCRIPTION OF THE EMBODIMENTS

Figure 1:
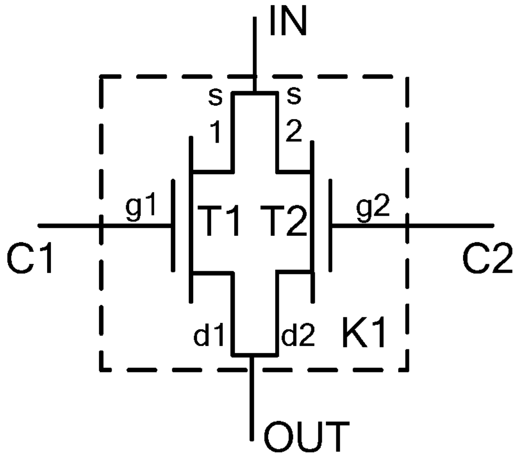
FIG. 1 is a structural diagram of a bidirectional selection unit based on an embodiment of the present disclosure.

In the following, the implementation of the present disclosure will be explicitly described via the drawings in combination with the embodiments. Hence, a skilled person can fully understand how to solve the technical problem by the technical means of the present disclosure and achieve the corresponding technical effects, and thereby can implement the same. Under a non-conflicting precondition, the embodiments of the present disclosure and all features in the embodiments can combine with each other, and the formed technical solutions are within the scope of the present disclosure.

In order to reduce the influence of a stress on TFT devices, in the embodiments of the present disclosure, a GOA drive unit is first provided. A bidirectional selection unit is arranged in the GOA drive unit. A plurality of control signals which are complementary to each other in timing sequence are applied to the bidirectional selection unit. The control signals respectively render different signal transmission channels in the bidirectional selection unit active in the timing sequences which are complementary to each other. That is to say, the bidirectional selection unit is made to show in a constant active state. However, since a plurality of channels are rendered active in different time periods for transmitting the selection signals in the bidirectional selection unit, an actual active duration of each channel is smaller than the constant turn-on duration of the bidirectional selection unit. Hence, this is beneficial for reducing the influence of the stress on the TFT devices.

Specifically, by using the interworking of a first control signal and a second control signal, the bidirectional selection unit is controlled to transmit a first selection signal required in the forward scanning. The first control signal corresponds to a first timing sequence; the second control signal corresponds to a second timing sequence; and the first control signal and the second control signal act on the bidirectional selection unit in the first timing sequence and the second timing sequence, respectively, so that the bidirectional selection unit is always in the active state in the first timing sequence and the second timing sequence and outputs the first selection signal, wherein the first timing sequence and the second timing sequence are complementary to each other.

By using the interworking of a third control signal and a fourth control signal, the bidirectional selection unit is controlled to transmit a second selection signal required in the backward scanning. The third control signal corresponds to a third timing sequence; the fourth control signal corresponds to a fourth timing sequence; and the third control signal and the fourth control signal act on the bidirectional selection units in the third timing sequence and the fourth timing sequence, respectively, so that the bidirectional selection unit is always in an active state in the third timing sequence and the fourth timing sequence and outputs the second selection signal, wherein the third timing sequence and the fourth timing sequence are complementary to each other.

The first timing sequence and the second timing sequence, which are complementary to each other, and the third timing sequence and the fourth timing sequence, which are complementary to each other, judged from waveforms of their corresponding timing sequences, are both high-level and low-level alternating waveforms. According to the timing sequence diagram of the sequence signals, at a same moment, the first control signal corresponding to the first timing sequence is a high level or a low level, and the second control signal corresponding to the second timing sequence is a low level or a high level; and at a same moment, the third control signal corresponding to the third timing sequence is a high level or a low level, and the fourth control signal corresponding to the fourth timing sequence is a low level or a high level.

In the following, two specific embodiments will be used to further illustrate the present disclosure.

Embodiment 1

FIG. 1 is a structural diagram of a bidirectional selection unit in a GOA drive unit according to a specific embodiment of the present disclosure. As shown in FIG. 1, the bidirectional selection unit comprises a first switching element K1, which has a first control end C1, a second control end C2, a signal input end IN, and a signal output end OUT.

Furthermore, the first switching element K1 includes two parallel TFT devices. As shown in FIG. 1, a first thin film transistor T1 and a second thin film transistor T2 constitute two parallel transmission channels, respectively. A source s1 of T1 is connected to a source s2 of T2, serving as the signal input end IN of the first switching element K1. A drain d1 of T1 is connected to a drain d2 of T2, serving as the signal output end OUT of the first switching element K1. A gate g1 of T1 serves as the first control end C1 of the first switching element K1; and a gate g2 of T2 serves as the second control end C2 of the first switching element K1.

When the first switching element K1 transmits a selection signal, the gate g1 of T1 is used to receive a first control signal or a third control signal; and the gate g2 of T2 is used to receive a second control signal or a fourth control signal. Moreover, the first control signal and the second control signal are complementary to each other in timing sequence; and the third control signal and the fourth control signal are complementary to each other in timing sequence.

Figure 2:
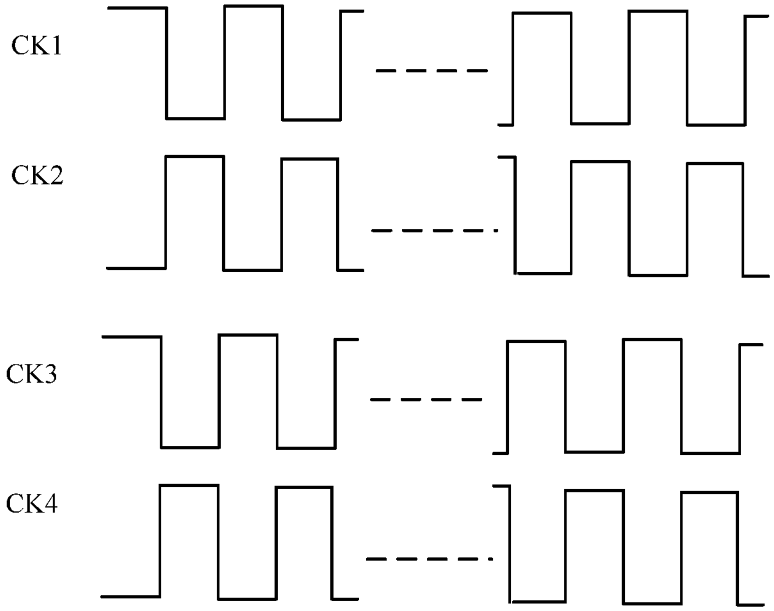
FIG. 2 is a timing sequence diagram of control signals applied when the bidirectional selection unit shown in FIG. 1 is operating.

FIG. 2 is a timing sequence diagram of the control signals applied when the bidirectional selection unit is operating, i.e., waveforms of the control signals input through the first control end C1 and the second control end C2 of the first switching element K1.

Specifically, as shown in FIG. 2, in forward scanning, the control signal received by C1 is the first control signal CK1; the control signal received by C2 is the second control signal CK2; and a first selection signal INF controls the forward scanning of the GOA drive circuit, and is connected to the signal input end IN, wherein, the waveforms of CK1 and CK2 are the square waves which are complementary to each other in timing sequence.

When CK1 is in a high level and CK2 is in a low level, T1 is in the active state and the first selection signal INF is transmitted to the signal output end OUT via the channel constituted by T1. At this moment, T2 is in the closed state. When CK1 is in a low level and CK2 is in a high level, T2 is in the active state and the first selection signal INF is transmitted to the signal output end OUT via the channel constituted by T2. At this moment, T1 is in the closed state. It can be seen that under an action of CK1 and CK2, the two thin film transistors, which constitute the first switching element K1, can be turned on alternately. The first switching element K1 as a whole shows a continuous active state, so as to achieve continuous output of the first selection signal INF.

Furthermore, as shown in FIG. 2, in backward scanning, the control signal received by C1 is the third control signal CK3; the control signal received by C2 is the fourth control signal CK4; and a second selection signal INB controls the backward scanning of the GOA drive circuit, and is connected to the signal input end IN, wherein, the waveforms of CK3 and CK4 are the square waves which are complementary to each other in timing sequence.

When CK3 is in a high level and CK4 is in a low level, T1 is in the active state and the second selection signal INB is transmitted to the signal output end OUT via the channel constituted by T1. At this moment, T2 is in the closed state. When CK3 is in a low level and CK4 is in a high level, T2 is in the active state and the second selection signal INB is transmitted to the signal output end OUT via the channel constituted by T2. At this moment, T1 is in the closed state. It can be seen that under an action of CK3 and CK4, the two thin film transistors, which constitute the first switching element K1, can be turned on alternately. The first switching element K1 as a whole shows a continuous active state, so as to achieve continuous output of the second selection signal INB.

In addition, as shown in FIGS. 2, T1 and T2 are turned on in the high level of the square waves CK1, CK2, CK3, and CK4, respectively. In order to ensure the reliable activation of T1 and T2, generally, a pulse width duration of the square waves should be no shorter than 1/60 second. That is to say, a highest frequency of a square wave signal is 30 Hz. Meantime, in order to reduce the influence of stress on the properties of the TFT devices, the constant active duration of T1 and T2 should be less than 1000 seconds, i.e., the frequency of the square wave signal should be more than or equal to 0.0005 Hz.

In the present embodiment, a selection output function of the bidirectional selection unit towards INF and INB is achieved. Moreover, in technique implementation, a breadth length ratio of the channel of the TFT devices can be further adjusted so that conductivity of each TFT device can meet design requirements.

In the present embodiment, the gates of the first thin film transistor T1 and the second thin film transistor T2 bear the control signals whose high levels and low levels vary alternately. The actual turn-on duration of each of T1 and T2 is smaller than the turn-on duration of the first switching element K1. Hence, the influence of stress on the thin film transistor can be reduced and thus the risk of the efficacy loss of the TFT devices can be reduced.

Embodiment 2

Figure 3:
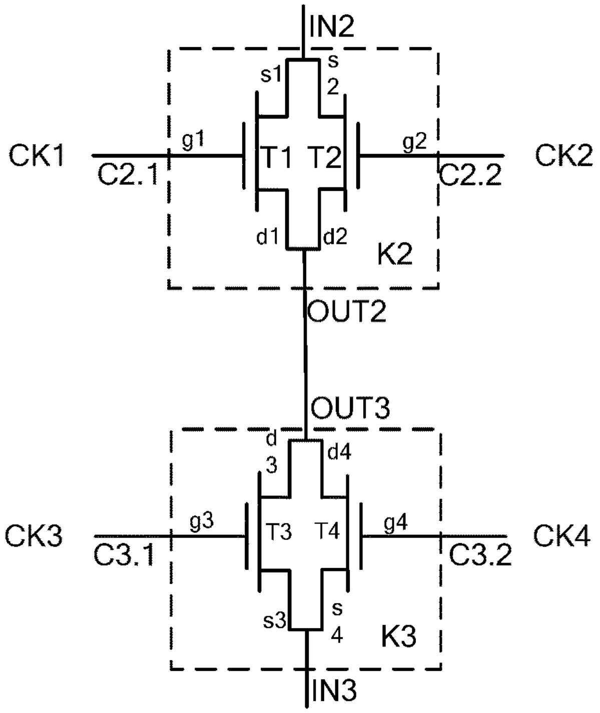
FIG. 3 is a structural diagram of a bidirectional selection unit based on another embodiment of the present disclosure.

FIG. 3 is a structural diagram of a bidirectional selection unit in a GOA drive unit based on another embodiment of the present disclosure. As shown in FIG. 3, the bidirectional selection unit comprises a second switching element K2 and a third switching element K3. The second switching element K2 has a first control end C2.1, a second control end C2.2, a signal input end IN2, and a signal output end OUT2. The third switching element K3 has a first control end C3.1, a second control end C3.2, a signal input end IN3, and a signal output end OUT3.

Furthermore, each of the second switching element K2 and the third switching element K3 includes two parallel TFT devices. As shown in FIG. 3, the second switching element K2 comprises a first thin film transistor T1 and a second thin film transistor T2, which constitute two parallel transmission channels, respectively. A source s1 of T1 is connected to a source s2 of T2, serving as the signal input end IN2 of the second switching element K2 and connecting to a first selection signal INF (forward scanning signal). A drain d1 of T1 is connected to a drain d2 of T2, serving as the signal output end OUT2 of the second switching element K2. The third switching element K3 comprises a third thin film transistor T3 and a fourth thin film transistor T4, which constitute two parallel transmission channels, respectively. A source s3 of T3 is connected to a source s4 of T4, serving as the signal input end IN3 of the third switching element K3 and connecting to a second selection signal INB (backward scanning signal). A drain d3 of T3 is connected to a drain d4 of T4, serving as the signal output end OUT3 of the third switching element K3. Moreover, OUT2 and OUT3 are connected.

Furthermore, a gate g1 of T1, serving as the first control end C2.1 of the second switching element K2, is connected to a first control signal CK1. A gate g2 of T2, serving as the second control end C2.2 of the second switching element K2, is connected to a second control signal CK2. A gate g3 of T3, serving as the first control end C3.1 of the third switching element K3, is connected to a third control signal CK3. A gate g4 of T4, serving as the second control end C3.2 of the third switching element K3, is connected to a fourth control signal CK4.

Figure 4:
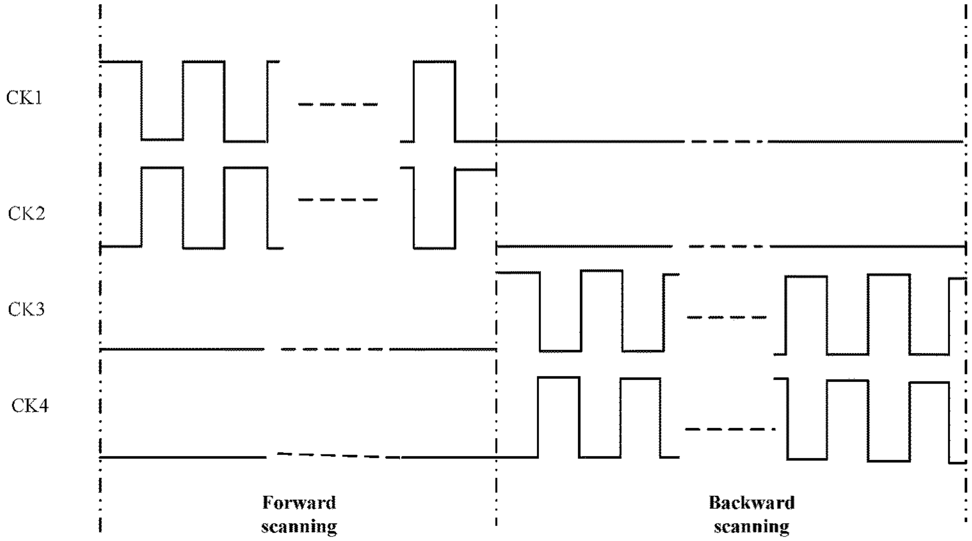
FIG. 4 is a timing sequence diagram of control signals applied when the bidirectional selection unit shown in FIG. 3 is operating.

FIG. 4 shows timing sequence of each control signal when the bidirectional selection unit is operating. As shown in FIG. 4, in the forward scanning, the waveforms of CK1 and CK2 are square waves which are complementary to each other in timing sequence. When CK1 is in a high level and CK2 is in a low level, T1 is in the active state while T2 is in the closed state. The first selection signal INF is transmitted to the signal output end OUT2 (OUT3) via the channel constituted by T1. When CK1 is in a low level and CK2 is in a high level, T2 is in the active state while T1 is in the closed state. The first selection signal INF is transmitted to the signal output end OUT2 (OUT3) via the channel constituted by T2. In the forward scanning, CK3 and CK4 are always kept in the low level. That is to say, T3 and T4 are in the closed state, and a transmitting path of the second selection signal INB is blocked.

Furthermore, as shown in FIG. 4, in the backward scanning, the waveforms of CK3 and CK4 are the square waves which are complementary to each other in timing sequence. When CK3 is in a high level and CK4 is in a low level, T3 is in the active state while T4 is in the closed state. The second selection signal INB is transmitted to the signal output end OUT3 (OUT2) via the channel constituted by T3. When CK3 is in a low level and CK4 is in a high level, T4 is in the active state while T3 is in the closed state. The second selection signal INB is transmitted to the signal output end OUT3 (OUT2) via the channel constituted by T4. In the backward scanning, CK1 and CK2 are always kept in the low level. That is to say, T1 and T2 are in the closed state, and a transmitting path of the first selection signal INF is blocked.

In the present embodiment, a selection output function of the bidirectional selection unit towards INF signal and INB signal is achieved. Moreover, according to the above working procedure, under the influence of the control signals CK1-CK4, the respective thin film transistors constituting the bidirectional selection unit are turned on alternately, and the bidirectional selection unit as a whole shows a constant active state. An actual turn-on duration of each of the respective thin film transistors is greatly reduced compared with the turn-on duration of the bidirectional selection unit. Hence, the influence of stress on the thin film transistor can be reduced and thus the risk of the efficacy loss of the TFT devices can be reduced.

Likewise, in the present embodiment, according to the property of the TFT devices, in order to ensure the reliable opening of each TFT device, generally, a pulse width duration of the square waves should be no shorter than 1/60 second. That is to say, a highest frequency of a square wave signal is 30 Hz. Meantime, in order to reduce the influence of stress on the properties of the TFT devices, the constant active duration of each TFT device should be less than 1000 seconds, i.e., the frequency of the square wave signal is more than or equal to 0.0005 Hz.

Furthermore, in the respective previous embodiments, an amplitude voltage of the square waves can be determined based on actual conditions of a display panel. For example, in one embodiment of the present disclosure, an amplitude of the square signal has a high voltage of +9 V and a low voltage of −7 V, which can ensure the reliable opening and closing of the respective TFT devices.

It can be easily understood that when the N-type TFT devices in each of the previous embodiments are all or partially replaced by P-type TFT devices, and the waves of the control signals are correspondingly modified, the present disclosure can also be achieved.

A GOA drive circuit can be formed by cascade connection of the GOA drive units having the above bidirectional selection unit. The GOA drive circuit possesses the function of bidirectional scanning. Moreover, as for the TFT devices of the bidirectional selection unit, the risk of the efficacy loss of the devices caused by the function of stress can be reduced greatly. The reliability of the GOA drive circuit can thus be improved. For specific implementation, reference can be made to relevant contents of the aforementioned embodiments, which will not be repeated herein.

The embodiments disclosed in the present disclosure are as above. However, the contents are merely the embodiments for convenient understanding of the present disclosure rather than limiting the present disclosure. Under the condition of not departing from the spirit and scope of the present disclosure, any person skilled in the art can make any amendment and variation towards the implementation mode and details. However, the scope of the present disclosure will still be in accordance with the scope defined in the attached claims.

The invention claimed is:

1. A GOA drive unit, comprising a bidirectional selection unit which is used to transmit a selection signal for controlling a scanning direction of the GOA drive unit, and is configured to:

receive a first control signal and a second control signal, which enable the bidirectional selection unit to be in an active state in a first timing sequence and a second timing sequence, respectively, and to output a first selection signal for controlling forward scanning of the GOA drive unit, wherein the first timing sequence and the second timing sequence are complementary to each other; and receive a third control signal and a fourth control signal, which enable the bidirectional selection unit to be in an active state in a third timing sequence and a fourth timing sequence, respectively, and to output a second selection signal for controlling backward scanning of the GOA drive unit, wherein the third timing sequence and the fourth timing sequence are complementary to each other;

wherein the bidirectional selection unit comprises a first switching element, wherein in the forward scanning, as for the first switching element, its signal input end receives the first selection signal; its first control end receives the first control signal; its second control end receives the second control signal; and its signal output end outputs the first selection signal under an action of the first control signal and the second control signal; and wherein in the backward scanning, as for the first switching element, its signal input end receives the second selection signal; its first control end receives the third control signal; its second control end receives the fourth control signal; and its signal output end outputs the second selection signal under an action of the third control signal and the fourth control signal;

wherein the first switching element comprises a first thin film transistor and a second thin film transistor, a source and a drain of the first thin film transistor being correspondingly connected to a source and a drain of the second thin film transistor, respectively;

a gate of the first thin film transistor receives the first control signal or the third control signal, and a grid of the second thin film transistor receives the second control signal or the fourth control signal; and the sources of the first thin film transistor and the second thin film transistor serve as the signal input end of the first switching element, and the drains of the first thin film transistor and the second thin film transistor serve as the signal output end of the first switching element;

wherein the first thin film transistor and the second thin film transistor are both N-type thin film transistors; or the first thin film transistor and the second thin film transistor are both P-type thin film transistors;

wherein the bidirectional selection unit is continuously in the active state to continuously output the first selection signal, by the first thin film transistor and the second thin film transistor being turned on alternately, corresponding to the first selection signal and the second selection signal;

wherein the bidirectional selection unit is continuously in the active state to continuously output the second selection signal, by the first thin film transistor and the second thin film transistor being turned on alternately, corresponding to the third selection signal and the fourth selection signal.

2. The GOA drive unit according to claim 1, wherein the bidirectional selection unit further comprises a second switching element and a third switching element, wherein as for the second switching element, its signal input end receives the first selection signal; its first control end receives the first control signal; and its second control end receives the second control signal; and wherein as for the third switching element, its signal input end receives the second selection signal; its first control end receives the third control signal; and its second control end receives the fourth control signal, wherein in the forward scanning, a signal output end of the second switching element outputs the first selection signal under an action of the first control signal and the second control signal, and the third switching element is in a closed state under an action of the third control signal and the fourth control signal; and wherein in the backward scanning, a signal output end of the third switching element outputs the second selection signal under a function of the third control signal and the fourth control signal, and the second switching element is in a closed state under a function of the first control signal and the second control signal.

3. The GOA drive unit according to claim 2, wherein:

the second switching element comprises a first thin film transistor and a second thin film transistor, a source of the first thin film transistor being correspondingly connected to a source of the second thin film transistor; the third switching element comprises a third thin film transistor and a fourth thin film transistor, a source of the third thin film transistor being correspondingly connected to a source of the fourth thin film transistor; and drains of respective thin film transistors are connected;

a gate of the first thin film transistor receives the first control signal; a gate of the second thin film transistor receives the second control signal; a gate of the third thin film transistor receives the third control signal; and a gate of the fourth thin film transistor receives the fourth control signal; and the sources of the first thin film transistor and the second thin film transistor serve as the signal input end of the second switching element; the sources of the third thin film 5 transistor and the fourth thin film transistor serve as the signal input end of the third switching element; and the drains, which are connected together, of respective thin film transistors serve as a common signal output end of the second switching element and the third switching element.

4. The GOA drive unit according to claim 3, wherein the first control signal, the second control signal, the third control signal, and the fourth control signal are all square signals.

5. The GOA drive unit according to claim 4, wherein a frequency of the square signals is in a range from 0.0005 Hz to 30 Hz.

6. The GOA drive unit according to claim 5, wherein an amplitude of the square signals has a high voltage of +9 V and a low voltage of −7 V.

7. A GOA drive circuit, which comprises cascaded GOA drive units, wherein the GOA drive circuit comprises a bidirectional selection unit which is used to transmit a selection signal for controlling a scanning direction of the GOA drive unit and is configured to:

receive a first control signal and a second control signal, which enable the bidirectional selection unit to be in an active state in a first timing sequence and a second timing sequence, respectively, and to output a first selection signal for controlling forward scanning of the GOA drive unit, wherein the first timing sequence and the second timing sequence are complementary to each other; and receive a third control signal and a fourth control signal, which enable the bidirectional selection unit to be in an active state in a third timing sequence and a fourth timing sequence, respectively, and to output a second selection signal for controlling backward scanning of the GOA drive unit, wherein the third timing sequence and the fourth timing sequence are complementary to each other;

wherein the bidirectional selection unit comprises a first switching element, wherein in the forward scanning, as for the first switching element, its signal input end receives the first selection signal; its first control end receives the first control signal; its second control end receives the second control signal; and its signal output end outputs the first selection signal under an action of the first control signal and the second control signal; and wherein in the backward scanning, as for the first switching element, its signal input end receives the second selection signal; its first control end receives the third control signal; its second control end receives the fourth control signal; and its signal output end outputs the second selection signal under an action of the third control signal and the fourth control signal;

wherein the first switching element comprises a first thin film transistor and a second thin film transistor, a source and a drain of the first thin film transistor being correspondingly connected to a source and a drain of the second thin film transistor, respectively;

a gate of the first thin film transistor receives the first control signal or the third control signal, and a gate of the second thin film transistor receives the second control signal or the fourth control signal; and the sources of the first thin film transistor and the second thin film transistor serve as the signal input end of the first switching element, and the drains of the first thin film transistor and the second thin film transistor serve as the signal output end of the first switching element;

wherein the first thin film transistor and the second thin film transistor are both N-type thin film transistors; or the first thin film transistor and the second thin film transistor are both P-type thin film transistors;

wherein the bidirectional selection unit is continuously in the active state to continuously output the first selection signal, by the first thin film transistor and the second thin film transistor being turned on alternately, corresponding to the first selection signal and the second selection signal;

wherein the bidirectional selection unit is continuously in the active state to continuously output the second selection signal, by the first thin film transistor and the second thin film transistor being turned on alternately, corresponding to the third selection signal and the fourth selection signal.

8. The GOA drive circuit according to claim 7, wherein the bidirectional selection unit further comprises a second switching element and a third switching element, wherein as for the second switching element, its signal input end receives the first selection signal; its first control end receives the first control signal; and its second control end receives the second control signal; and wherein as for the third switching element, its signal input end receives the second selection signal; its first control end receives the third control signal; and its second control end receives the fourth control signal, wherein in the forward scanning, a signal output end of the second switching element outputs the first selection signal under an action of the first control signal and the second control signal, and the third switching element is in a closed state under an action of the third control signal and the fourth control signal; and wherein in the backward scanning, a signal output end of the third switching element outputs the second selection signal under a function of the third control signal and the fourth control signal, and the second switching element is in a closed state under a function of the first control signal and the second control signal.

9. The GOA drive circuit according to claim 8, wherein:

the second switching element comprises a first thin film transistor and a second thin film transistor, a source of the first thin film transistor being correspondingly connected to a source of the second thin film transistor; the third switching element comprises a third thin film transistor and a fourth thin film transistor, a source of the third thin film transistor being correspondingly connected to a source of the fourth thin film transistor; and drains of the respective thin film transistors are connected;

a gate of the first thin film transistor receives the first control signal; a gate of the second thin film transistor receives the second control signal; a gate of the third thin film transistor receives the third control signal; and a gate of the fourth thin film transistor receives the fourth control signal; and the sources of the first thin film transistor and the second thin film transistor serve as the signal input end of the second switching element; the sources of the third thin film transistor and the fourth thin film transistor serve as the signal input end of the third switching element; and the drains, which are connected together, of respective thin film transistors serve as a common signal output end of the second switching element and the third switching element.

10. The GOA drive circuit according to claim 9, wherein the first control signal, the second control signal, the third control signal, and the fourth control signal are all square signals.

11. The GOA drive circuit according to claim 10, wherein a frequency of the square signals is in the range from 0.0005 Hz to 30 Hz.

12. The GOA drive circuit according to claim 11, wherein an amplitude of the square signals has 5 a high voltage of +9 V and a low voltage of −7 V.

* * * * *